Jan. 20, 1931.　　　J. P. CENTER　　　1,789,514
SHOCK ABSORBING DEVICE
Filed Aug. 25, 1927
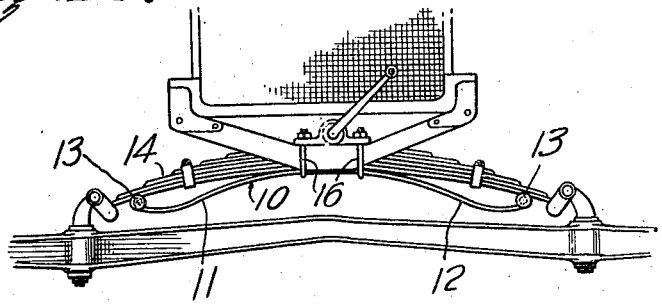
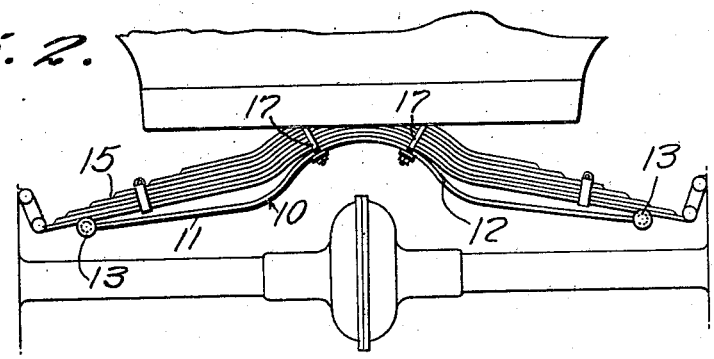
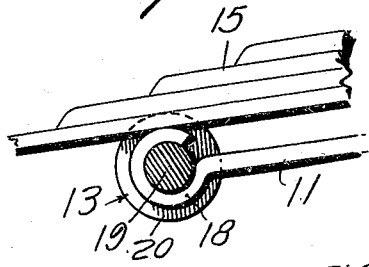
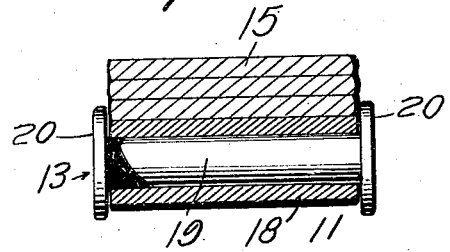
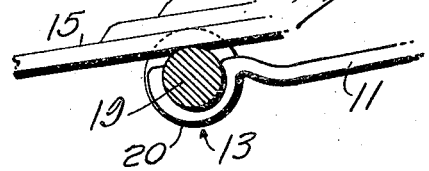
Inventor
J. P. CENTER,
By
Attorney Patented Jan. 20, 1931

1,789,514

UNITED STATES PATENT OFFICE

JOSEPH P. CENTER, OF HARLOWTON, MONTANA

SHOCK-ABSORBING DEVICE

Application filed August 25, 1927. Serial No. 215,447.

My invention relates to shock absorbing devices in connection with the usual leaf springs of a motor vehicle and has for an important object an auxiliary leaf spring which is held in position by means of the usual spring holding means. A further object of my invention resides in an apparently simple and highly efficient device which may be readily applied in its proper position and easily removed therefrom if desired. The scope of my invention extends to whatever constructions may be defined by or included in the terms or language of the appended claims.

In the drawings:—

Figure 1 is a partial front elevation of a simple form of motor car embodying my invention;

Figure 2 is a similar view illustrating the invention as applied to the rear springs;

Figures 3 and 4 are detailed views showing the ends of my improved auxiliary spring in position with respect to the usual leaf spring; and Figure 5 is a detailed view illustrating another form of my invention.

My invention in the form or embodiment shown in the drawing comprises a spring, 10, having oppositely extending portions, 11 and 12, to which are attached at their extreme ends retaining members indicated generally as at, 13.

As is clearly illustrated in Figures 1 and 2 of the accompanying drawing the auxiliary spring, 10, is held in its proper position below the usual leaf springs, 14 and 15 by means of the clips or bolts, 16 and 17. Each end of the extensions, 11 and 12, as is clearly shown in Figure 3, is provided with circularly bent or loop portions, 18, for the purpose of supporting the retaining members, 13.

These retaining members, 13, are preferably formed with a shank portion, 19, which is adapted to fit the loop, 18, and a pair of enlarged hubs or flanges, 20. The flanges, 20, preferably extend beyond the diameter of the loops, 18, sufficiently to overlap or extend beyond the adjacent leaf spring of the motor vehicle, for the purpose of preventing the displacement of the free ends of the auxiliary springs with respect to the usual spring members.

Figures 3 and 4 illustrate the extreme or loop ends, 18, of my auxiliary spring as bearing directly against the adjacent leaf of the main spring for the purpose of minimizing the friction therebetween.

Although the auxiliary spring is of substantially the same width as the usual leaf spring it is obvious that the thickness thereof may be increased according to the load of the particular motor vehicle to which it is attached.

By reason of the fact that the points of contact between my auxiliary spring and the main leaf springs are located near the extreme ends of the leaf springs a very efficient cushioning or shock absorbing action is effected.

I claim:—

1. In combination with a downwardly bowed leaf spring, a shock absorbing spring leaf member bowed upwardly intermediately of its ends for contact upwardly with the central portion of said leaf spring, said spring leaf having its extremities bearing upwardly against the leaf spring adjacent its respective ends and the portions thereof between its upwardly bowed center and said extremities spaced beneath the leaf spring whereby said spring leaf will absorb the shock of rebound movements of said leaf spring.

2. In combination with a downwardly bowed leaf spring, a shock absorbing spring leaf member bowed in the same direction as the leaf spring but on an arc struck on a shorter radius whereby said spring leaf will contact with the leaf spring at the under side of its center but curve downwardly away from the leaf spring outwardly of the center, said spring leaf having its ends curved gradually upward and outward to contact with the under face of the leaf spring adjacent its respective ends for the purpose described.

3. In combination with a downwardly bowed leaf spring, a shock absorbing spring leaf member bowed in the same direction as the leaf spring but on an arc struck on a shorter radius whereby said spring leaf will contact with the leaf spring at the under side of its center but curve downwardly away from the leaf spring outwardly of the center, said spring leaf having its ends curved gradually upward and outward to contact with the under face of the leaf spring adjacent its respective ends, each spring leaf terminating in a loop, and retainers respectively supported in said loops for sliding engagement with the leaf spring and cooperating therewith to retain the spring leaf against movement transverse to said leaf spring, said retainers each comprising a shank supported in the loop and having end flanges engageable with the opposite sides of the vehicle spring.

JOSEPH P. CENTER.